UNITED STATES PATENT OFFICE.

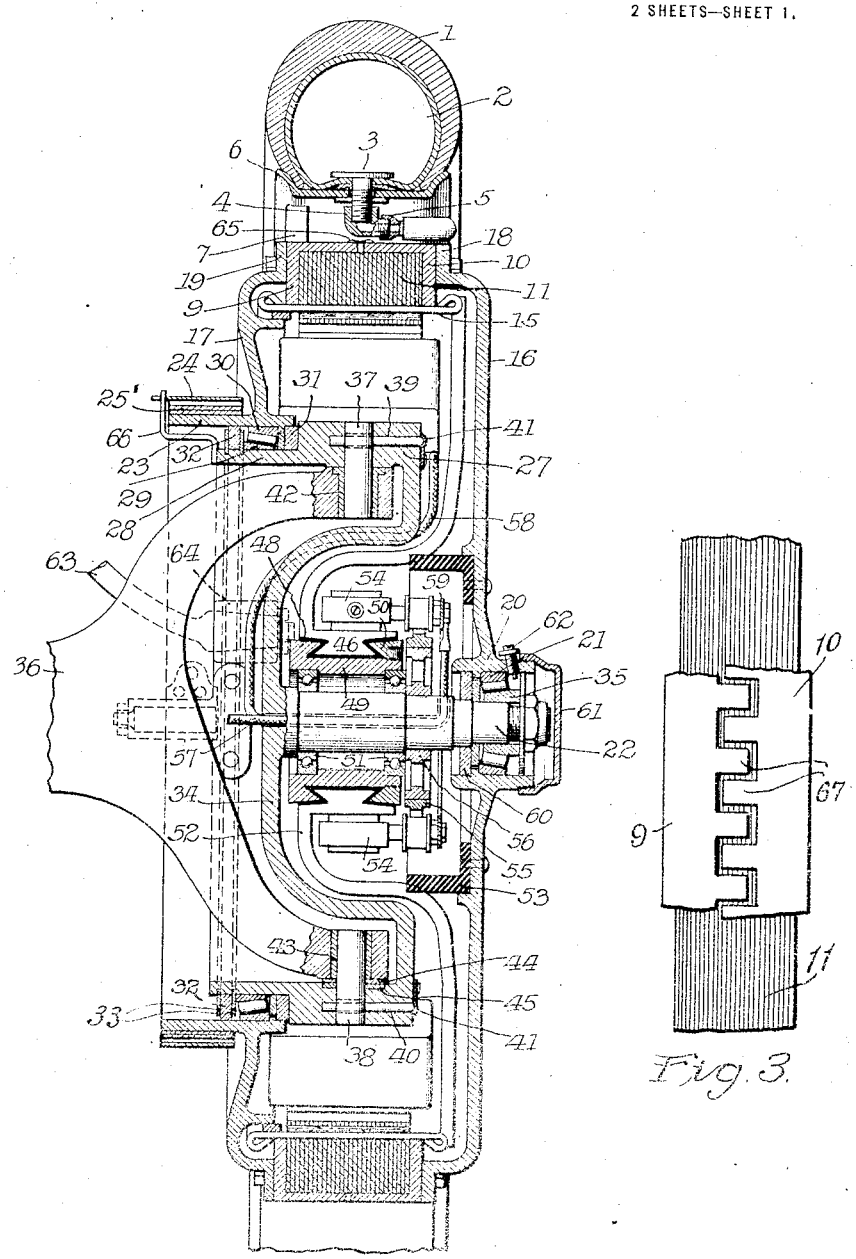

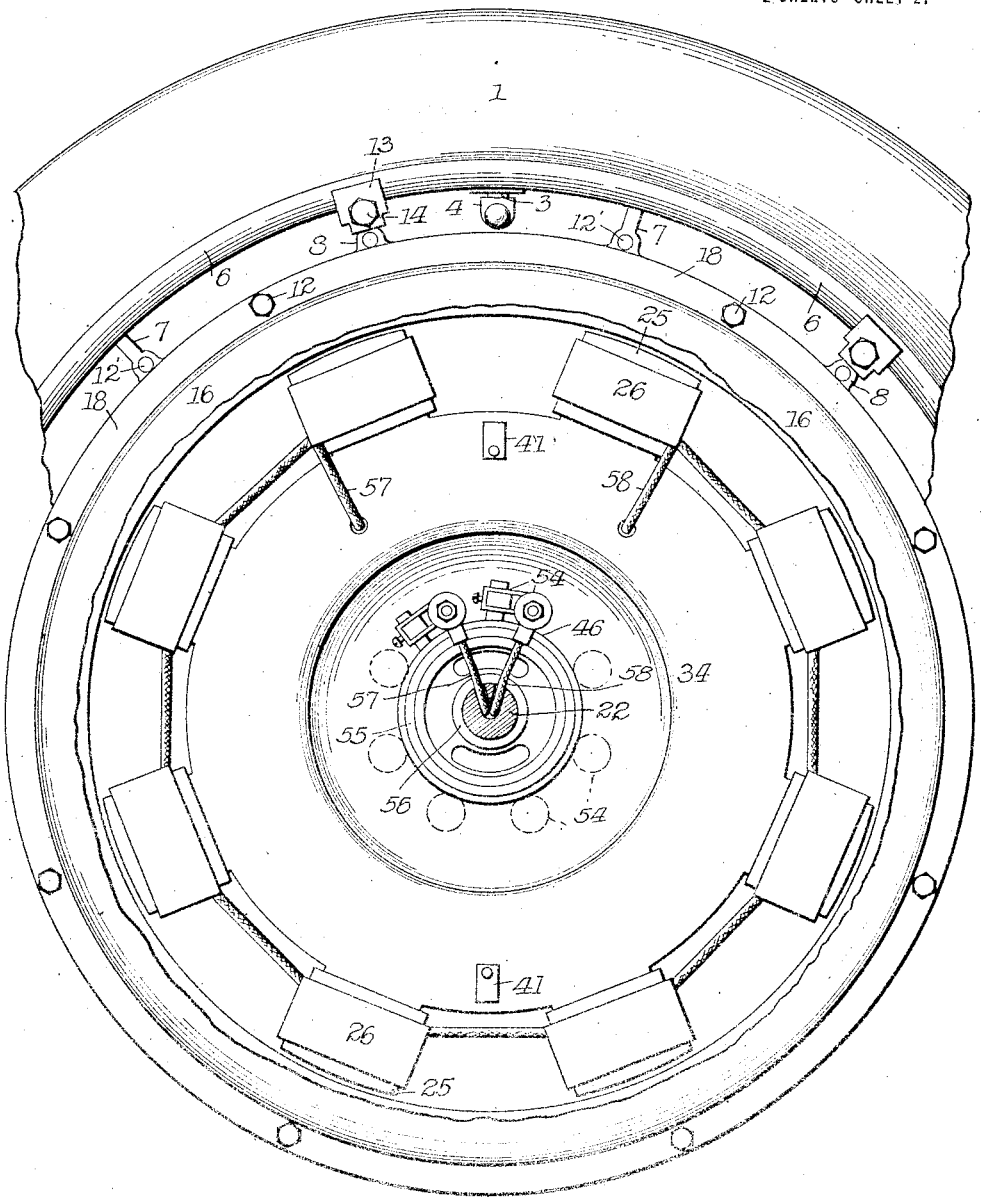

JOHN McLEAN KINGSBURY, OF GREAT FALLS, MONTANA, ASSIGNOR TO KINGSBURY GAS-ELECTRIC MOTOR CAR COMPANY, OF GREAT FALLS, MONTANA, A CORPORATION OF MONTANA.

ELECTRIC-VEHICLE WHEEL.

1,270,420.　　　　Specification of Letters Patent.　　Patented June 25, 1918.

Application filed April 12, 1915. Serial No. 20,629.

*To all whom it may concern:*

Be it known that I, JOHN McLEAN KINGSBURY, a citizen of the United States, residing at Great Falls, in the county of Cascade and State of Montana, have invented a certain new and useful Improvement in Electric-Vehicle Wheels, of which the following is a full, clear, concise, and exact description, reference being had to the accompanying drawings, forming a part of this specification.

My invention relates to electric-vehicle wheels and, more particularly, to a driving wheel bearing its own motor-element.

The present invention is an improvement upon the structure shown in my application No. 13,041, filed March 8th, 1915, and aims to provide a structure in which economy of space and material is effected.

The invention also provides improved means for supporting the rim spaced from the motor element, and means for giving ready access to the air-valve. Novel means for driving the commutator as a separate unit is also provided. Various other features of improvement will be apparent from the following specification.

In the accompanying drawings I have illustrated one embodiment in which my invention may appear.

Figure 1 is a vertical cross section of one form of my vehicle wheel;

Fig. 2 is a front elevation with parts broken away.

Fig. 3 is a fragmentary elevation showing the interlocking parts of the clamping rings for preventing the laminations from slipping out between these rings.

The wheel is provided with the usual pneumatic tire having a shoe 1 and an inner inflatable tube 2, having the usual valve-stem 3, which in this case is shortened and provided with an L 4 and an extension 5 leading off at right angles to the main axis of the stem, providing ready access to the valve itself, even when placed adjacent the motor-element, to be described later.

The tire 1 is mounted on the rim 6, which is supported upon short spokes 7, 8, which are cast or formed integral with the coöperating armature frame-pieces 9, 10, which inclose the laminations 11, forming the magnetic circuit of the armature of the motor, as will be described later.

The armature frame-pieces 9 and 10 are provided with interlocking fingers 67, either pointed or square, as shown in Fig. 3, so that the same will support all of the laminations 11, allowing the laminations to be compressed by the rivets 12', which fasten the armature frame-pieces together.

The fingers 67 prevent any of the laminations 11 from getting out of alinement, but at the same time they permit the rings 9 and 10 to be drawn toward each other to clamp the laminations firmly.

The rim 6 is held upon the spokes 7 and 8 by means of the wedges 13, which are clamped by means of the bolts 14. The laminations 11 are formed in the shape of a ring having a square cross section, the inner periphery of this ring being notched or grooved to receive the armature winding 15, which is distributed uniformly thereupon. The central part of the wheel structure is formed of the outer disk casting 16 and the inner disk casting 17. These castings are provided with flanges 18 and 19, respectively, which lie flat upon the faces of the armature frame-pieces 9 and 10, and are bolted thereto by bolts 12 to form a rigid structure.

The outer disk 16 is provided with a hub portion 20, in which is mounted a roller-race 21, forming the stationary part of a roller-bearing between the hub and the stationary bearing-shaft 22.

The inner disk is provided with a brake-drum 23, which is encircled by the brake-band 24, having suitable lining or facing 25'. Between the inner and outer disks are placed the field-poles 25, having suitable windings 26 thereupon, these poles being supported upon, or formed integral with, the hub casting 27, which, on account of its function of supporting the field-poles, may be termed a field-drum.

The field-drum 27 is provided with an annular flange 28, between which and the inner disk casting are mounted a pair of raceways 29 and 30, forming the stationary and rotating parts of a roller-bearing, respectively. An inner felt ring 31 prevents any dirt or dust from entering the roller-bearing from the field space, and an outer felt ring 32, which is mounted between two spring rings 33, excludes dust and dirt from the outside.

The field-drum or casting 27 is provided with an inwardly-budging central portion 34, which has formed thereupon the bearing shaft or axle 22. The axle 22 supports at its outer end a roller-race 35, which, in connection with the race 21, forms a front bearing between the stationary and the movable parts. The drum 27 is secured to the front axle 36, which has its end forked or bifurcated, the prongs or bifurcations of the fork being just far enough apart to pass within the hub casting 27, to which they are secured by the bearing-pins 37 and 38, respectively. The bearing-pins 37 and 38 are removably secured to the hub-casting 27, as by means of pins 39 and 40, held in place by spring-clips 41. The forks of the hub 36 are provided with suitable bushings 42 and 43, to provide bearing surfaces coöperating with the pins 37 and 38, respectively.

Inasmuch as the weight of the vehicle is supported upon the lower forks, bearing-plates 44 and 45 are provided to reduce the friction and wear between these parts. A commutator 46, which is connected with the armature windings 15, is disposed in the hollow 34 of the hub-casting 27. The commutator segments are mounted in the usual manner, between a flange 48 mounted upon the central supporting-cylinder 49 and the gripping flange or ring 50, which is screwed into place and secured by a locking ring, to prevent the same from coming loose.

The central drum 49, which supports the commutator segments, is mounted for rotation on the axle 22 by means of the anti-friction bearings 51. The commutator-bars are connected mechanically and electrically to the field windings by means of the bar conductors 52. These bar conductors 52 are spaced apart by means of the insulating ring 53, which is bolted upon the outer disk 16. The insulating ring 53 also serves as a driving means for the commutator through the bars 52, which are connected to the commutator-bars, so that the commutator rotates in unison with the armature itself.

The brushes 54 are mounted in suitable brush-holders, secured upon an adjustable ring 55, mounted on a stationary ring 56, which is keyed upon the axle 22. The connection between the armature and the field is a series connection; that is, the motor itself is a series motor and the leads 57 and 58 to the field winding 26 are connected in series with the armature, alternate brushes being connected together by means of the copper bars 59, the axle 22 being provided with a passageway for receiving the conductors 57 and 58. The hub 20 of the outer disk is protected by a felt ring 60 and by an outer cap 61, which prevents dust from entering the roller-bearings 21—35. The hub is also provided with an oil-hole closed by the screw-plug 62.

The hub-casting 27 is provided with a lug 64, to which is fastened a steering connection 63, which may be of any preferred type.

The valve 5, which is provided with the elbow 4, may be turned at right angles to the position shown in Fig. 1, so that the same lies substantially in the median plane of the wheel. When in this position it may be retained by means of the spring clip 65.

It will be noted that the pins 37 and 38 are disposed in the median plane of the wheel and in axial alinement with each other. This arrangement allows of turning the vehicle on a very short radius, and reduces the effort of steering to a minimum.

The brake-band 24 may be tightened in any convenient manner, as by a shaft containing a flexible portion, or universal connection, the brake-band being held in a relatively-stationary position by means of the bracket 66, which is secured to the field casting 27.

A vehicle may be equipped with front and rear wheels of this type, or with front or rear wheels only of this type, the other wheels being plain.

I do not intend to be limited to the precise construction shown and described, as numerous changes and modifications will suggest themselves to those skilled in the art, all of which I consider to come within the spirit and scope of my invention.

What I claim as new and desire to secure by Letters Patent of the United States is the following:

1. In combination, an axle, a rotatable ring mounted thereupon, said ring comprising a series of annular laminations, annular frame rings for clamping said laminations together, said frame rings having off-set interlocking fingers lying at the same radial distance from the center of the ring; and means connecting said frame rings with said axle.

2. In combination, an axle, an armature surrounding said axle, said armature comprising a plurality of annular laminations, interlocking rings for said laminations, said clamping rings having square interlocking fingers lying at the same radial distance from the center and being so organized as to permit compression of the laminations and to prevent relative angular displacement of the rings with respect to each other, central annular disks secured to each of said clamping rings and bearing means for each of said disks.

3. In combination, a wheel rim, a motor armature connected to said rim, a vehicle axle, a motor field member connected to said axle, said field and said armature being concentric with each other, a commutator lying within said field and being concentric therewith, said armature, field and commutator lying substantially in the same plane, and leads connecting the armature and commutator, said leads forming the sole driving connection between armature and commutator.

4. In combination, a vehicle rim, a motor armature-member connected to said rim, a vehicle axle, a motor field-member connected to said axle, the connection between said axle and said field-member forming a pivoted pin joint lying substantially in the median plane of said armature and field, and a commutator rotatable with said armature, said commutator lying within said field-member and substantially in the same plane therewith.

5. In combination, a wheel rim, a movable motor-element connected to said rim, a vehicle axle, a stationary motor-element connected to said axle, a frame for said stationary element, said frame comprising a depressed central portion lying within the periphery of said stationary element, and a commutator disposed in said depressed portion, a central axle passing through said commutator and having bearings coöperating therewith, said vehicle axle being bifurcated, and embracing said depressed portion.

6. In combination, a vehicle-wheel rim, a movable motor-element secured thereto, a vehicle axle, a stub axle connected to said vehicle axle, a pivoted connection between said vehicle axle and said stub axle, a stationary motor-element mounted on said vehicle axle, a commutator mounted on said stub axle, said rim, said motor-element and said commutator lying in substantially the same plane.

7. In combination, a vehicle-wheel rim, a movable motor-element connected to said rim, a stationary motor-element, a frame for said stationary motor-element, a vehicle axle pivotally secured to said frame, a stub axle rigidly secured to said frame, a commutator rotatably mounted on said stub axle, a mechanical connection between said movable motor-element and said commutator, said connection comprising radial conducting-bars each secured to a segment of said commutator.

8. In combination, a vehicle-wheel rim, a motor armature secured to said rim, a vehicle axle, a motor field frame pivotally connected with said vehicle axle, said frame lying within said motor armature, a stub axle connected to said frame, a disk having bearings upon said stub axle, said disk being secured to said motor armature, a commutator rotatably mounted upon said stub axle, and having its segments connected to the windings of said armature, and means for driving said commutator, said means comprising the electrical connections between said segments and said armature windings.

9. In combination, a wheel rim, a motor armature concentric with said rim and secured thereto, a central axle, a commutator on said axle, a disk connected to said motor armature and having bearings on said axle, radial connections between said armature and said commutator, and a ring of insulation, said ring connecting said disk with said armature connections.

10. In combination, a vehicle wheel rim, a motor armature concentric with and secured to said rim, a vehicle axle, a field frame pivotally connected to said vehicle axle, said frame having a central depressed portion, a stub axle connected to said portion, a commutator rotatably mounted on said stub axle, an outer disk secured to said motor armature and having bearings upon said stub axle, an inner disk having bearings upon said field frame, and means for preventing the entry of dust to said bearings and to said commutator.

In witness whereof, I hereunto subscribe my name this 6th day of April, A. D. 1915.

J. McLEAN KINGSBURY.

Witnesses:
GORDON O. SHAFER,
EDMUND LINCOLN.